US012303725B2

(12) United States Patent
Stradford

(10) Patent No.: US 12,303,725 B2
(45) Date of Patent: May 20, 2025

(54) NOSE MASK

(71) Applicant: Shirley Doloris Stradford, Culver City, CA (US)

(72) Inventor: Shirley Doloris Stradford, Culver City, CA (US)

( * ) Notice: Subject to any disclaimer, the term of this patent is extended or adjusted under 35 U.S.C. 154(b) by 0 days.

(21) Appl. No.: 18/427,712

(22) Filed: Jan. 30, 2024

(65) Prior Publication Data

US 2024/0252851 A1 Aug. 1, 2024

Related U.S. Application Data

(60) Provisional application No. 63/576,250, filed on Jan. 30, 2023.

(51) Int. Cl.

*A62B 18/02* (2006.01)
*A41D 13/11* (2006.01)
*A62B 23/02* (2006.01)
*A62B 23/06* (2006.01)

(52) U.S. Cl.

CPC ........ *A62B 18/025* (2013.01); *A41D 13/1115* (2013.01); *A62B 23/025* (2013.01); *A62B 23/06* (2013.01)

(58) Field of Classification Search

CPC ..... A62B 18/025; A62B 23/06; A62B 23/025; A41D 13/1107; A41D 13/1115; A41D 13/1123; A41D 13/113; A41D 13/1161

See application file for complete search history.

(56) References Cited

U.S. PATENT DOCUMENTS 3,603,315 A * 9/1971 Becker, III ......... A41D 13/1115 128/206.19
3,613,678 A * 10/1971 Mayhew ............ A41D 13/1115 128/206.19
5,803,077 A * 9/1998 Gazzara ............ A41D 13/1115 128/206.13

(Continued)

FOREIGN PATENT DOCUMENTS

CN 205549277 U * 9/2016
CN 113142712 A * 7/2021

(Continued)

OTHER PUBLICATIONS

English translation for KR-20090049628, machine translated by espacenet.com.*

(Continued)

*Primary Examiner* — Tu A Vo
(74) *Attorney, Agent, or Firm* — Michael D. Eisenberg

(57) ABSTRACT

A nose mask includes: a main body, a wire, and ear straps. The main body is formed by joining together an innermost layer, an outermost layer, and a middle layer. The wire is located near a top end of the main body and can bend to a desired shape and retain the desired shape. The ear straps extend laterally away from the sides of the main body. The main body has a distance between a top end and a bottom end, such that when the nose mask is worn by a user, the nose mask covers a nose of the user, while leaving a mouth and eyes of the user uncovered. The wire can bend over a bridge of the user's nose, thereby causing the main body to form fit over the nose bridge. The ear straps can loop around respective ears of the user.

11 Claims, 6 Drawing Sheets

(56) References Cited

U.S. PATENT DOCUMENTS

| | | | | | |
|---|---|---|---|---|---|
| 5,954,055 | A * | 9/1999 | Miyake | A41D 13/1115 | 128/206.13 |
| 2004/0089304 | A1* | 5/2004 | Barakat | A41D 13/1115 | 128/206.12 |
| 2005/0133034 | A1* | 6/2005 | Jensen | A41D 13/1115 | 128/206.13 |
| 2006/0130214 | A1* | 6/2006 | Steindorf | A41D 13/1115 | 128/206.13 |
| 2011/0308525 | A1* | 12/2011 | Lu | A41D 13/1115 | 128/206.19 |
| 2012/0199142 | A1* | 8/2012 | Nagao | A41D 13/1115 | 128/863 |
| 2017/0106217 | A1* | 4/2017 | Kuhn | A41D 13/1115 | |
| 2021/0267286 | A1* | 9/2021 | Heo | A41D 13/1161 | |
| 2022/0047013 | A1* | 2/2022 | Nabai | A41D 13/1161 | |
| 2022/0132949 | A1* | 5/2022 | Ambartsoumian | A62B 23/06 | 128/206.19 |
| 2022/0192290 | A1* | 6/2022 | Lee | A41D 13/1161 | |
| 2023/0000186 | A1* | 1/2023 | Weng | A41D 13/1115 | |

FOREIGN PATENT DOCUMENTS

| | | | | |
|---|---|---|---|---|
| CN | 116687087 | A * | 9/2023 | A41D 13/1115 |
| GB | 871661 | A * | 6/1961 | |
| JP | 3126242 | U * | 10/2006 | |
| KR | 200389496 | Y1 * | 7/2005 | |
| KR | 20090049628 | A * | 5/2009 | |
| KR | 101355247 | B1 * | 1/2014 | |
| KR | 20140034170 | A * | 3/2014 | |
| WO | WO-2020181382 | A1 * | 9/2020 | A41D 13/11 |

OTHER PUBLICATIONS

English translation for CN 113142712, machine translated by espacenet.com.*

English translation of KR 101355247, machine translated by Espacenet.com, translated on Mar. 18, 2025.*

English translation of CN 116687087, machine translated by Espacenet.com, translated on Mar. 18, 2025.*

* cited by examiner

NOSE MASK

CROSS-REFERENCES TO RELATED APPLICATIONS

This application claims priority from U.S. Provisional Application Ser. No. 63/576,250 filed Jan. 30, 2023, which is hereby incorporated herein by reference in the respective in its entirety.

TECHNICAL FIELD

This invention relates to the field of Personal Protective Equipment (PPE) and more specifically to protective face masks.

BACKGROUND OF THE INVENTION

Facemasks are worn by users to provide a physical barrier to smoke, droplets, dirt, dust and powder. A facemask may be worn by a person to protect the person from outer elements. Thus, people may wear facemasks produced for the general population to filter dust, pollutants from air entering the respiratory system, or to filter droplets, some of which may carry harmful viruses or bacteria. A person may wear a mask also to protect themselves and others from droplets (saliva, mucus) generated by the breathing of a non mask-wearing person. Such droplets may carry viruses and/or bacteria. During the COVID pandemic, the general population has been advised (and sometimes forced to by law) to wear face masks to decrease or prevent the spread of the COVID virus.

Facemasks, however, may be uncomfortable to wear in everyday life. In fact, facemasks may feel claustrophobic, and prevent people from eating or even having conversations. Due to these reasons, opposition to mandatory wearing of facemasks has been voiced in many countries during the COVID pandemic.

Brief Summary of Embodiments of the Invention

An aim of the present invention is to provide a mask that is comfortable and therefore promotes public awareness of the importance of wearing masks, to prevent or decrease the spread of airborne and other infectious diseases.

An aspect of some embodiments of the present invention relates to a nose mask, comprising: a innermost layer, a outermost layer, and a middle layer. The innermost layer, the outermost layer, and the middle layer are joined together to form a main body extending vertically from a top end to a bottom end and extending horizontally between a first side and a second side; a wire contained in the main body and located near the top end of the main body, the wire being configured to be bent to a desired shape and retain the desired shape when bent; and ear straps joined to the main body and extending laterally away from the first side and the second side. The main body has a vertical distance between the top end and the bottom end, such that when the nose mask is worn by a user, the nose mask covers a nose of the user, while leaving a mouth and eyes of the user uncovered. The wire is configured to bend over a bridge of the user's nose when the mask is worn by the user, thereby causing the main body to form fit over the nose bridge. Each of the ear straps is configured loop around a respective ear of the user.

In a variant, the innermost layer, the outermost layer, and the middle layer are joined together via horizontal stitchings located near the top end and the bottom end, and via vertical stitchings located near the first side and the second side.

In a variant, the main body is folded in a horizontal box pleat configuration maintained by further vertical stitchings on both the first side and the second side.

In a variant, the middle layer is a filter configured to filter air passing through the mask.

In a variant, the middle layer comprises non-woven, melt-blown polypropylene material.

In a variant, the outermost layer and the innermost layer comprise non-woven, spun-bond polypropylene material.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration, these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

The present invention relates to a nose mask configured to cover a user's nose, while leaving the user's mouth uncovered. The nose mask of the present invention can be worn by users to protect the respiratory system from environmental contaminants, while allowing the user to eat or talk, and without causing the claustrophobic feeling that a face mask may create.

Figure 1:
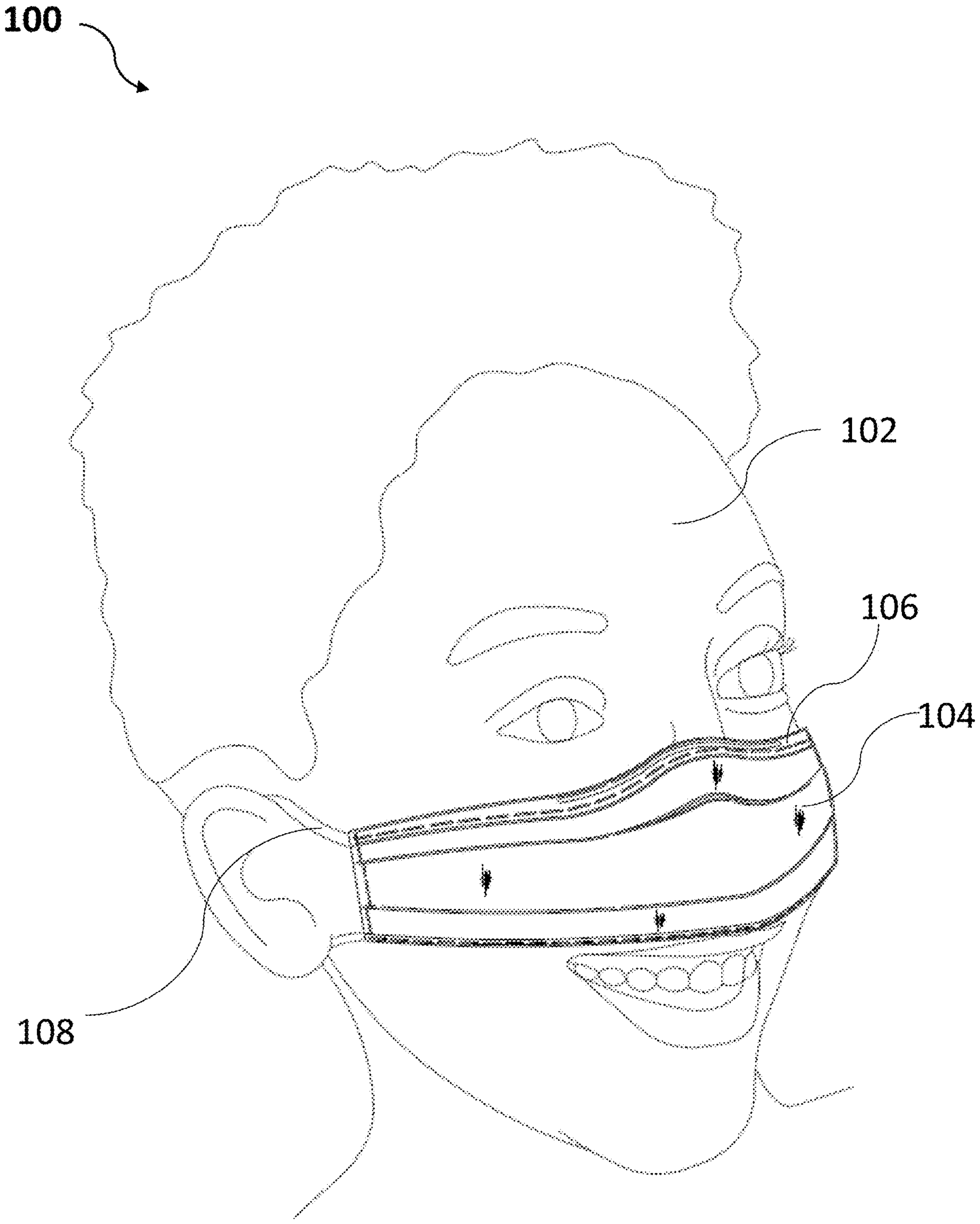
FIG. 1 illustrate a nose mask worn by a user, according to some embodiments of the present invention.
Figure 2:
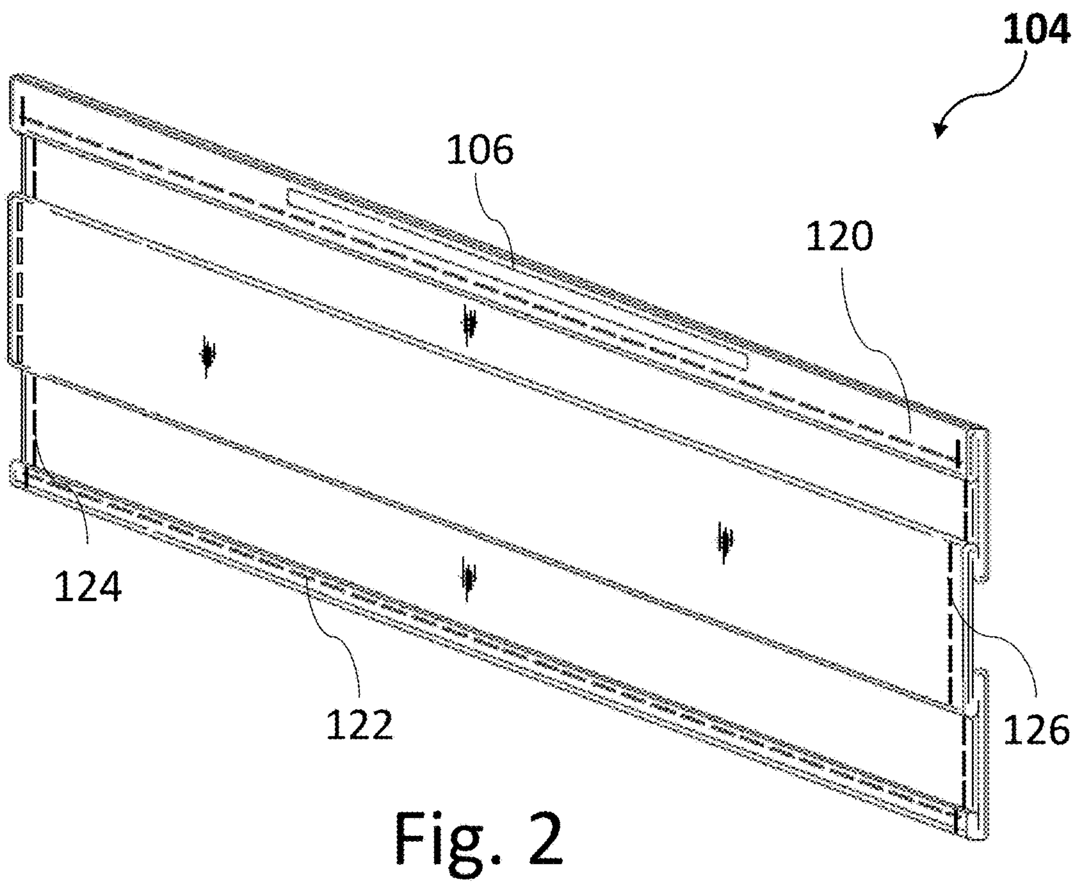
FIG. 2 is a three-quarters front view of the main body of the nose mask, according to some embodiments of the present invention.
Figure 3:
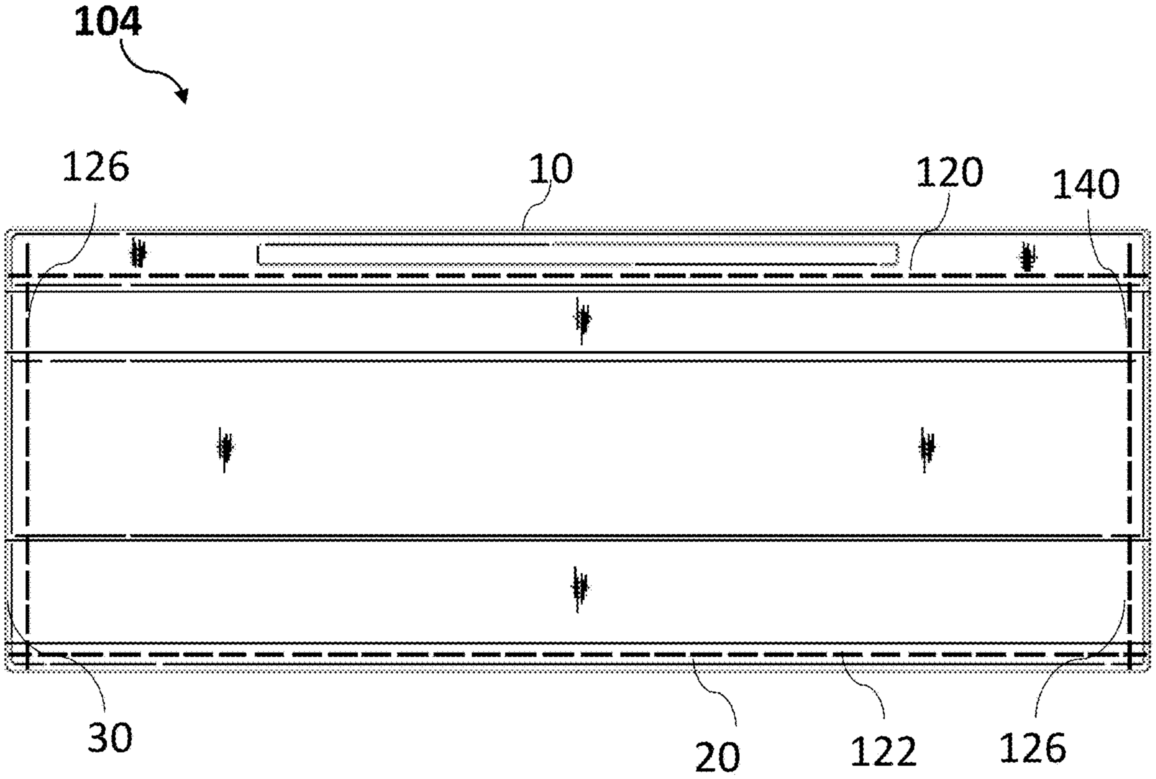
FIG. 3 is a front view of the main body of the nose mask, according to some embodiments of the present invention.
Figure 4:
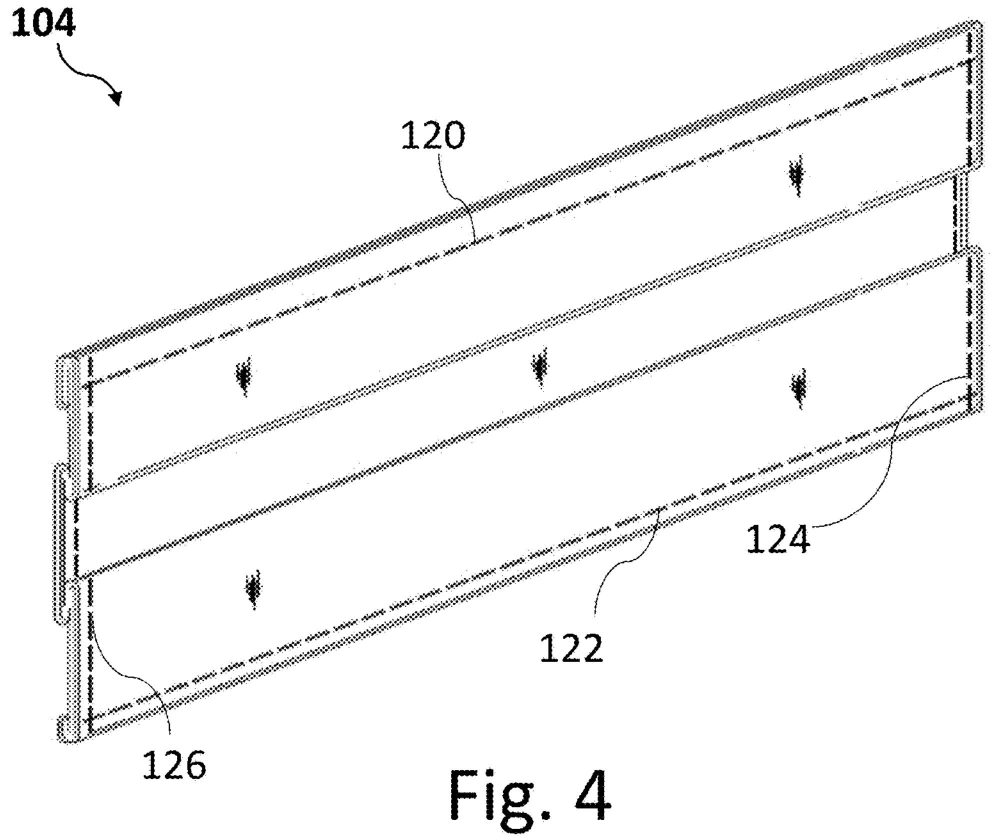
FIG. 4 is a three-quarters rear view of the main body of the nose mask, according to some embodiments of the present invention.
Figure 5:
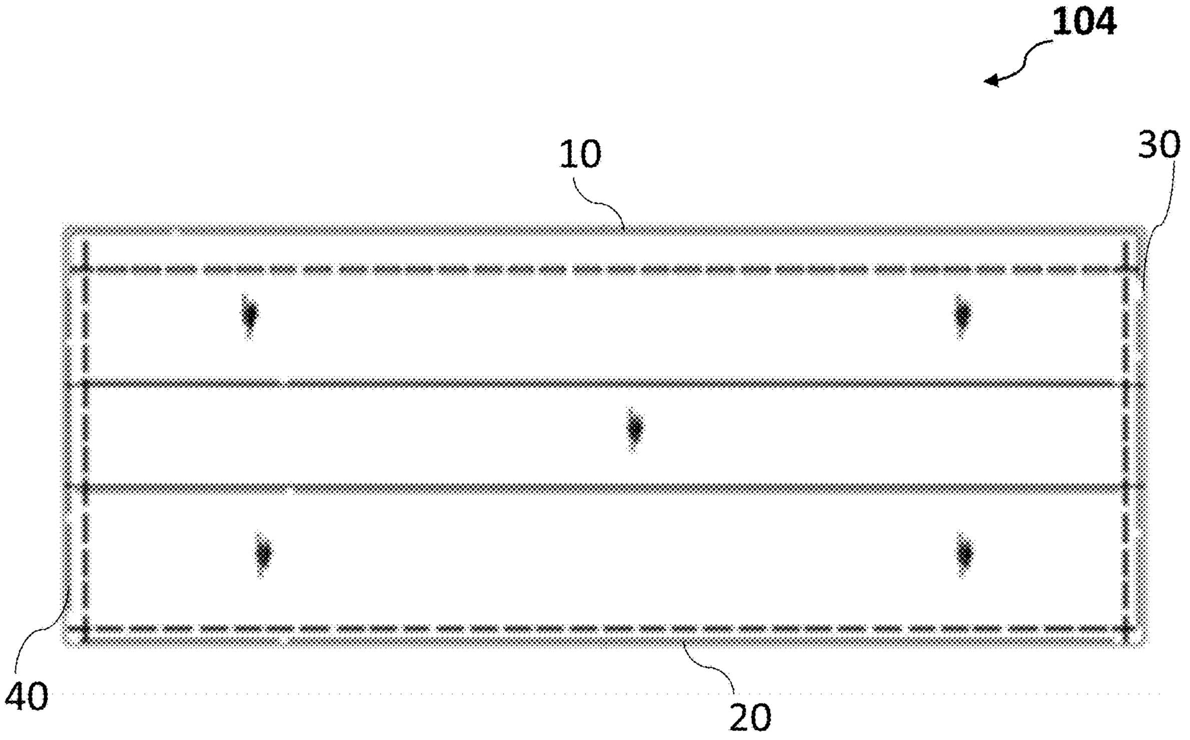
FIG. 5 is a rear view of the main body of the nose mask, according to some embodiments of the present invention.
Figure 6:
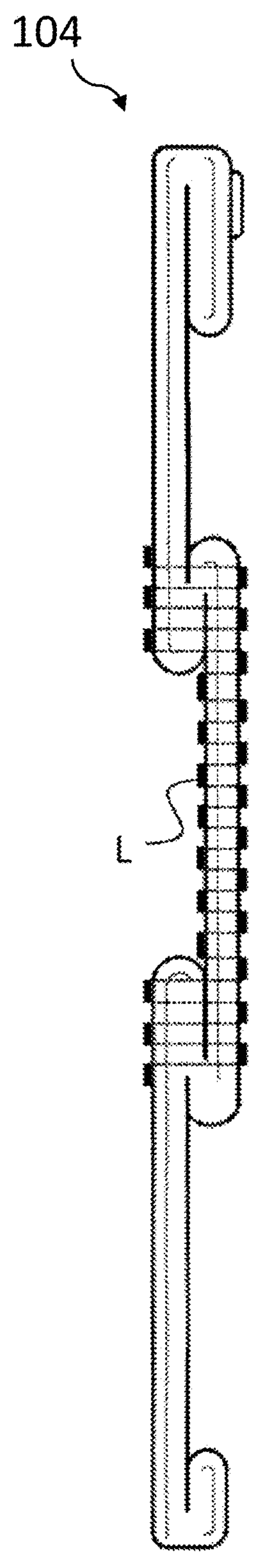
FIG. 6 is a side view of the main body of the nose mask, according to some embodiments of the present invention.
Figure 7:
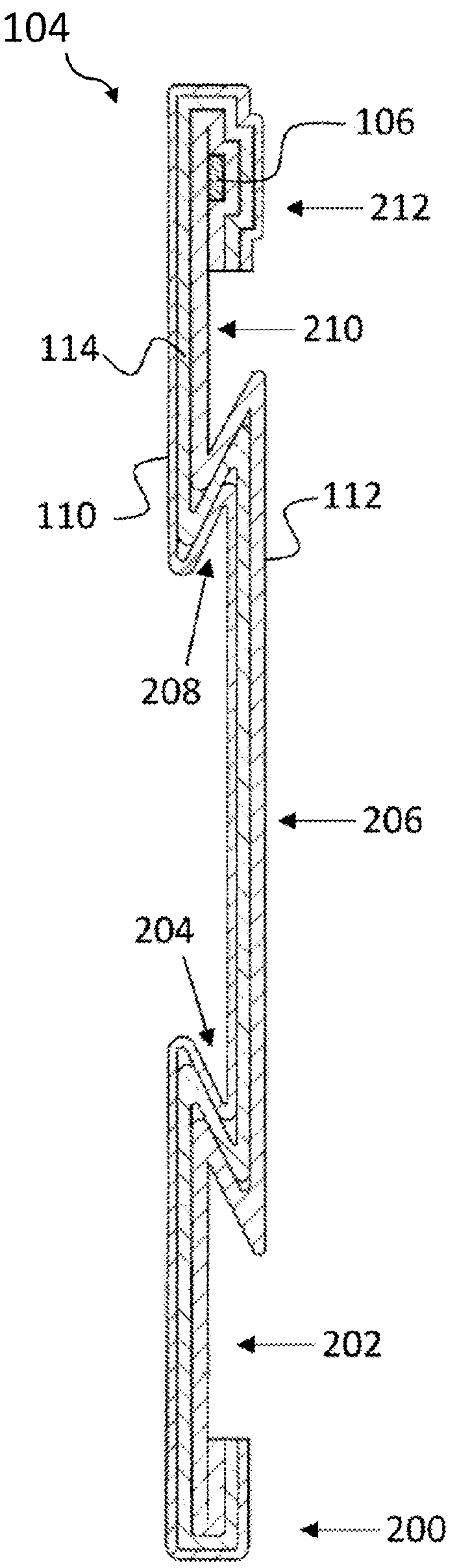
FIG. 7 is a side cross-sectional view of the main body of the nose mask, according to some embodiments of the present invention.

Reference is made to FIGS. 1-7. FIG. 1 illustrates a nose mask 100 worn by a user 102, according to some embodiments of the present invention. The mask 100 includes a main body 104, a wire 106, and ear straps 108. FIG. 2 is a three-quarters front view of the main body 104 of the nose mask, according to some embodiments of the present invention. FIG. 3 is a front view of the main body 104 of the nose mask, according to some embodiments of the present invention. FIG. 4 is a three-quarters rear view of the main body 104 of the nose mask, according to some embodiments of the present invention. FIG. 5 is a rear view of the main body 104 of the nose mask, according to some embodiments of the present invention. FIG. 6 is a side view of the main body of the nose mask 104, according to some embodiments of the present invention. FIG. 7 is a side cross-sectional view of the main body 104 of the nose mask, according to some embodiments of the present invention.

The mask 100 includes a main body 104, a wire 106, and ear straps 108. The main body 104 extends vertically from a top end 10 to a bottom end 20 and extends horizontally between a first side 30 and a second side 40. The main body includes an innermost layer 110, an outermost layer 112, and a middle layer 114 sandwiched between the innermost layer 110 and the outermost layer 112. The innermost layer 110, the outermost layer 112, and the middle layer 114 may be joined together at or near the lateral sides thereof and at or near the top and bottom ends thereof.

The wire 106 is contained in the main body and located near the top end 10 of the main body. The wire 106 is configured to be bent to a desired shape and retain the desired shape when bent. Two ear straps 108 are joined to the main body 104 at the sides of main body. A first ear strap extends laterally away from the first side 30, while a second eat strap extends laterally away from the second side 40.

The main body has a vertical distance between the top end 10 and the bottom end 20, such that when the nose mask 100 is worn by a user, the main body 104 covers a nose of the user, while leaving a mouth and eyes of the user uncovered. The top end 10 is aligned with the nose bridge while the bottom end 20 is located below the nasal base. The vertical distance between the top end 10 and the bottom end 20 may be, for example, 1.5-4 inches. It should be noted that masks of different sizes can be made to fit people having faces of different sizes. In a non-limiting example, a horizontal distance between the first side 30 and the second side 40 is about 6-10 inches. It should be noted that the scope of present invention encompasses masks of any desired sizes.

The wire 106 is configured to bend over a bridge of the user's nose when the mask is worn by the user 102, thereby causing the top end 10 of main body to form fit over the nose bridge. The wire may be a plastic or metallic wire. In a non-limiting example, the wire is in the form of a flat strip having a length of 5 inches and a height of ⅛ inch, made of coated flexible plastic.

Each of the ear straps 108 is configured loop around a respective ear of the user. The straps 108 may be elastic, so that looping the straps around the user's ears pulls keeps the nose mask 100 in place over the user's nose, while the flexible wire conforms the mask to the nose bridge of the user.

In some embodiments of the present invention, the main body 104 is folded in a horizontal box pleat configuration. The box pleat configuration is maintained by joining the folded main body onto itself on both the first side 30 and the second side 40. The box pleat configuration is advantageous as the folded box can be pushed outwards by the nose when the mask is worn, creating an empty space around the nose and allowing the user to breathe more easily. This feature lowers the discomfort and any claustrophobic feeling that may be caused by wearing the mask 100, while keeping the nose mask formfitting via the flexible wire over the nose bridge.

In some embodiments of the present invention, shown in FIG. 7, a cross sectional view of the main body 104 is shown. The main body 104 includes a first fold 200 which forms U shaped turn at a bottom end of the main body 104. The U shaped turn is connected to a bottom section 202. The bottom section forms a first junction 204 with a middle section 206. The first junction 204 is angled relative to the bottom section 202 and the middle section 206. The middle section 206 is connected a top section 210 and forms a second junction 208 with the top section 210. The second junction 208 is angled relative to the middle section 206 and top section 210. The top section 210 is connected to a second fold 212 with forms a U shaped turn at a top end. The wire 106 is located within the second fold 212.

The first junction 204 and the second junctions 208 are angled in opposite directions to one another. In a variant, the first junction is angled upward and the second junction is angled downward.

In some embodiments of the present invention, the innermost layer 110, the outermost layer 112, and the middle layer 114 are joined together via horizontal stitchings 120 and 122 located respectively near or at the top end 10 and the bottom end 20, and via vertical stitchings 124 and 126 located near or at the first side 30 and the second side 40.

In some embodiments of the present invention, the middle layer 114 forms a filter configured to filter air passing through mask. To this end, the middle layer 114 may include non-woven, melt-blown polypropylene material, which is able to capture very fine particles.

In some embodiments of the present invention, the outermost layer and the innermost layer comprise non-woven, spun-bond polypropylene fabric. This is advantageous, as this type of material allows the passage of air, but is a water repellent. Thus, polypropylene spun-bond, non-woven fabrics forming the outermost layer and innermost layer effectively block visible objects, large droplets and adsorb hot air exhaled from the body and leaves the skin dry. The non-woven fabric has better bacteria filtration and air permeability which is used for the outermost and innermost layers. The middle layer, polypropylene non-woven, melt-blown fabric acts as the filter layer between the two layers of spun-bond fabric.

It should be noted that other materials may be used, such as woven fabrics, cotton, silk, chiffon, linen, polyester, knitted and flannel material.

Means of joining the layers together other than stitching may be used, such as laser suturing.

Referring now to FIGS. 8-10 and 6, for producing the nose mask are illustrated.

In some embodiments of the present invention the nose mask 100 is produced as follows:

A middle filter layer 114, outermost layer 112 and an innermost layer 110 are provided, all having the same dimensions, for example measuring about 6½ inches×3½ inches.

The middle filter layer 114 is placed between the outermost layer 112 and the innermost layer 110.

The layers are pinned together on all sides to keep the layers even, together, and aligned with each other.

Figure 8:
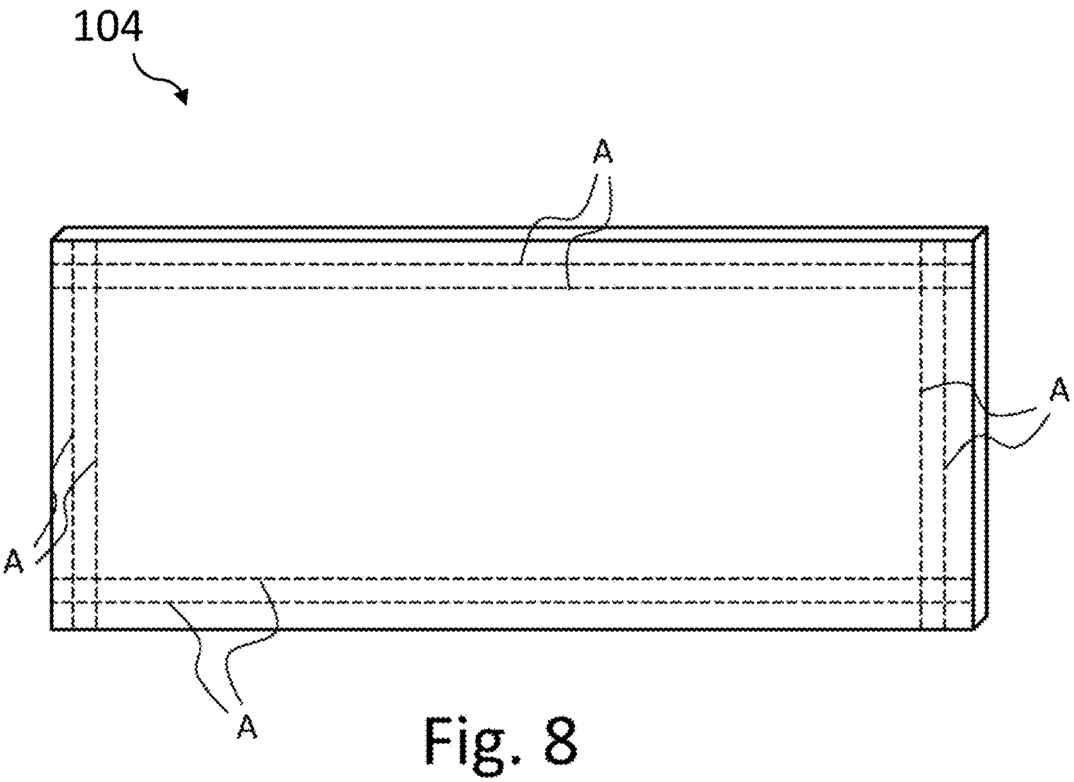
FIGS. 8-10 illustrate steps for constructing the nose mask, according to some embodiments of the present invention.

At about ⅛ inches from each edge, the layers are sewn together with first stitchings parallel to each edge. At about ¼ inches from each edge, the layers are sewn together with second stitchings parallel to each edge. Thus, two lines of stitches A around all four sides secure the layers to each other and form an unfolded main body 104, as seen in FIG. 8. The lateral sides of the main body 104 are the sides 30 and 40.

Figure 9:
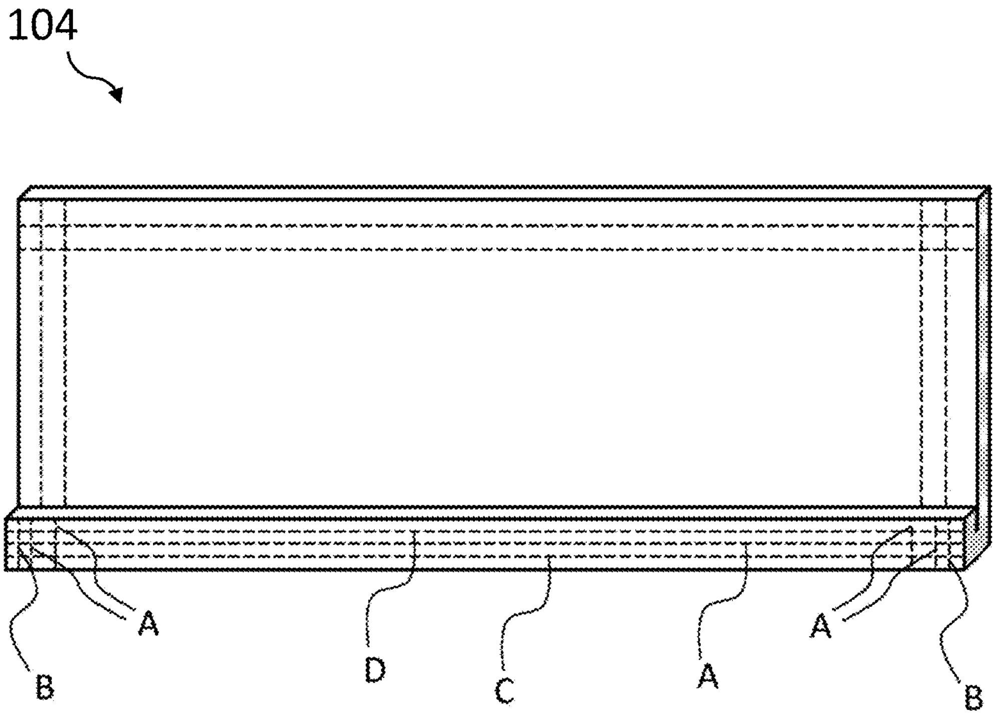

In FIG. 9, the bottom of the unfolded main body 104 is folded, about ¼ inch upward vertically and pinned in place to create a bottom fold. The bottom edge of the fold is the end 20.

At each side, about ½ inch of the elastic strap is placed ½ inch inside the bottom fold and pinned in place.

A vertical stitching B is sewn about 1/16 inch from each lateral side inch over the elastic strings to hold the elastic strings into in place.

A first bottom horizonal stitching C is sewn about 1/16 inch above the bottom edge of bottom fold from side to side. This is the first bottom sew line.

A second bottom horizonal stitching D is sewn about 3/16 inch above the bottom edge of bottom fold from side to side. This is the second bottom sew line.

Figure 10:
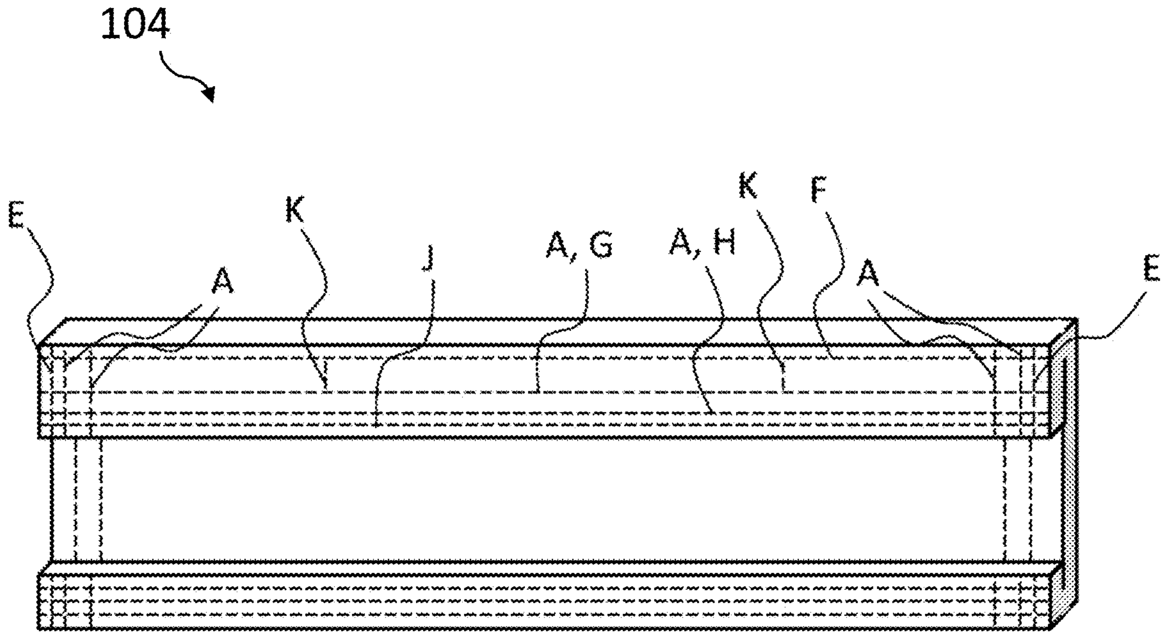

In FIG. 10, the top of the main body 104 is folded about ½ inch forward and down to create a top fold. Both sides and the middle are pinned. The top edge of the top fold is the end 10 of the main body 104.

At each side, about ½ inch of the elastic strap is placed ½ inch inside the top fold and pinned in place.

A vertical stitching E is sewn about 1/16 inches from each lateral side and is sewn 1/16 inches over the elastic strings to hold the elastic strings in place. The elastic strings are now sewn securely to the main body 112 and can be placed over the ears.

A first top horizonal stitching F is sewn about 1/16 inch below the top end 10 from side to side. This is the first top sew line.

A second top horizonal stitching G is sewn about 4/16 inch below the top end 10 from side to side. This is the second top sew line.

A third top horizonal stitching His sewn about 6/16 inch below the top end 10 from side to side. This is the third top sew line.

A third top horizonal stitching J is sewn about 7/16 inch below the top end 10 from side to side. This is the fourth top sew line.

A 5-inch long, ⅛ inch-wide flat, coated, flexible, plastic single-strip of wire 106 is inserted into the top fold through the opening between first top sew line and the second top sew line. The wire 106 is placed horizontally in the middle of the top fold.

Vertical stitches K are sewn to on each side of the wire 106. For example, the vertical stitches may be at a distance of about ⅝ inch from the lateral sides of the main body 104.

The main body 104 now measures about 6½ inches from the side 30 to the side 40, and about 2¾ inches from the end 10 to the end 20.

To construct, the box pleat, from the top of the main body, on each side: a first mark is measured at about ⅞ inch from the top, a second mark is measured at about 1⅛ inch, a third mark is measured at 1⅝ inch, a fourth mark is measured at about 1⅞ inch.

On each side, the second mark is pinched, folded up to meet the first mark, and pinned in place. On each side, the third mark is pinched, folded down to meet the fourth mark, and pinned in place. Thus a box pleat is created.

A vertical stitching line L is sewn at ⅛ inch from one side of the main body 104, over a first side of box pleat side. A similar vertical stitching line (not shown, but similar to L) is sewn at about ⅛ inch from the other side of the main body 104, over a second side of box pleat side. In this manner, the box pleat is maintained from the sides, as seen in FIG. 6.

After this folding, the main body measures about 6½×1¾ inches.

It should be noted that all measurements mentioned below may have an error of ±10%.

What is claimed is:

1. A nose mask, comprising:

an innermost layer, an outermost layer, and a middle layer sandwiched between the innermost layer and the outermost layer, wherein the innermost layer, the outermost layer, and the middle layer are joined together to form a main body extending vertically from a top end to a bottom end and extending horizontally between a first side and a second side;

and ear straps joined to the main body and extending laterally away from the first side and the second side;

wherein:

the main body has a vertical distance between the top end and the bottom end, such that when the nose mask is worn by a user, the nose mask configured to cover a nose of the user, while leaving a mouth and eyes of the user uncovered and the main body is folded in a horizontal box pleat configuration having a single horizontal box pleat maintained by a first vertical stitching on the first side and a second vertical stitching on the second side further vertical stitching on both the first side and the second side, the single horizontal box pleat extends from the first side to the second side and the single horizontal box pleat is positioned between the top end and the bottom end, the main body comprising a top horizontal forward facing recess formed between a top bend of the single horizontal box pleat and the top end, the main body comprising a bottom horizontal forward facing recess formed between a bottom bend of the single horizontal box pleat and the bottom end;

and the nose mask is configured to not cover both the nose and mouth, whereby when the nose mask is worn by the user with the top end positioned on a bridge of the nose of the user and with each of the ear straps is configured loop around a respective ear of the user, the bottom end is configured to be positioned between the nose and the mouth of the user and the single horizontal box pleat is configured to be pushed outward by the nose of the user, thereby forming a space for accommodating the nose of the user, wherein the single horizontal box pleat is the only pleated structure positioned between the top end and the bottom end and the single horizontal box pleat having a single horizontal non-pleated forward facing portion extending from the first bend to the second bend.

2. The nose mask of claim 1, wherein the innermost layer, the outermost layer, and the middle layer are joined together via a first horizontal stitching located near the top end and a second horizontal stitching near the bottom end, and via a third vertical stitching located near the first side and a fourth vertical stitching near the second side.

3. The nose mask of claim 1, where the middle layer is a filter configured to filter air passing through the mask.

4. The nose mask of claim 3, wherein the middle layer comprises non-woven, melt-blown polypropylene material.

5. The nose mask of claim 1, wherein the outermost layer and the innermost layer comprise non-woven, spun-bond polypropylene material.

6. The nose mask of claim 1, wherein in a cross section view, the main body comprises a first fold which forms U shaped turn at a bottom end, the U shaped turn is connected to a bottom section; the bottom section forms a first junction with a middle section, the first junction being angled relative to the bottom and middle sections; the middle section is connected a top section and forms a second junction with the top section, the second junction being angled relative to the middle and top sections; the first junction and the second junction are angled in opposite directions to one another; wherein the top section is connected to a second fold, thereby forming a U shaped turn at a top end.

7. The nose mask of claim 6 wherein the first junction is angled upward and the second junction is angled downward.

8. The nose mask of claim 6, further comprising a wire contained in the main body and located near the top end of the main body, the wire being configured to be bent to a desired shape and retain the desired shape when bent, and wherein the wire is located in the second fold.

9. The nose mask of claim 1, further comprising a wire contained in the main body and located near the top end of the main body, the wire being configured to be bent to a desired shape and retain the desired shape when bent.

10. A nose mask, comprising:

an innermost layer, an outermost layer, and a middle layer sandwiched between the innermost layer and the outermost layer, wherein the innermost layer, the outermost layer, and the middle layer are joined together to form a main body extending vertically from a top end to a bottom end and extending horizontally between a first side and a second side; and ear straps joined to the main body and extending laterally away from the first side and the second side;

wherein:

the main body has a vertical distance between the top end and the bottom end, such that when the nose mask is worn by a user, the nose mask configured to cover a nose of the user, while leaving a mouth and eyes of the user uncovered and the main body is folded in a horizontal box pleat configuration having a single horizontal box pleat, the single horizontal box pleat extends from the first side to the second side and the single horizontal box pleat is positioned between the top end and the bottom end, the main body comprising a top horizontal forward facing recess formed between a top bend of the single horizontal box pleat and the top end, the main body comprising a bottom horizontal forward facing recess formed between a bottom bend of the single horizontal box pleat and the bottom end;

the nose mask is configured to not cover both the nose and mouth, whereby when the nose mask is worn by the user with the top end positioned on a bridge of the nose of the user and with each of the ear straps is configured loop around a respective ear of the user, the bottom end is configured to be positioned between the nose and the mouth of the user and the single horizontal box pleat is configured to be pushed outward by the nose of the user, thereby forming a space for accommodating the nose of the user, wherein the single horizontal box pleat is the only pleated structure positioned between the top end and the bottom end and the single horizontal box pleat having a single horizontal non-pleated forward facing portion extending from the first bend to the second bend; and in a cross section view, the main body comprises a first fold which forms a U shaped turn at a bottom end, the U shaped turn is connected to a bottom section; the bottom section forms a first junction with a middle section, the first junction being angled relative to the bottom and middle sections; the middle section is connected a top section and forms a second junction with the top section, the second junction being angled relative to the middle and top sections; the first junction and the second junction are angled in opposite directions to one another; wherein the top section is connected to a second fold, thereby forming a U shaped turn at a top end.

11. The nose mask of claim 10, further comprising a wire contained in the main body and located near the top end of the main body, the wire being configured to be bent to a desired shape and retain the desired shape when bent.

* * * * *